United States Patent [19]

Munch

[11] 3,887,425

[45] June 3, 1975

[54] CONCENTRATING ACRYLAMIDE SOLUTIONS

[75] Inventor: Robert James Munch, Stamford, Conn.

[73] Assignee: American Cyanamid Company, Stamford, Conn.

[22] Filed: Oct. 1, 1973

[21] Appl. No.: 402,654

[52] U.S. Cl. ............ 159/48 L; 260/561 N; 260/704; 159/2 R; 159/3; 159/31; 159/47 R; 159/DIG.10; 203/8; 23/306

[51] Int. Cl...... C07c 103/00; B01d 1/00; B01d 1/16

[58] Field of Search ...... 23/302 A, 306; 260/561 N, 260/704; 159/2, 3, 48 L, DIG. 10, 2 R, 6 R, 31, 47 R; 203/8

[56] References Cited
UNITED STATES PATENTS

| | | | |
|---|---|---|---|
| 2,771,490 | 11/1956 | Stoddard | 23/302 A |
| 2,969,347 | 1/1961 | Bellinger | 158/48 L |
| 3,296,240 | 1/1967 | MacDonald | 159/48 L |
| 3,324,180 | 6/1967 | Beer | 23/302 A |
| 3,449,216 | 6/1969 | Baird | 159/48 L |
| 3,546,289 | 12/1970 | Kiikka | 260/561 N |
| 3,549,706 | 12/1970 | Takaki | 23/302 A |
| 3,624,154 | 11/1971 | Robbins | 260/561 N |
| 3,699,081 | 10/1972 | Iwashita | 260/561 N |
| 3,805,870 | 4/1974 | Schenk | 159/48 L |

Primary Examiner—Norman Yudkoff
Assistant Examiner—S. J. Emery
Attorney, Agent, or Firm—Gordon L. Hart

[57] ABSTRACT

For rapid concentration of aqueous acrylamide solutions while inhibiting polymer formation, water is removed by vacuum flash evaporation with constant washing of evaporator walls. The residue is not allowed to accumulate in the evaporator; it is removed to atmospheric pressure and aerated to restore oxygen to saturation in the solution.

4 Claims, 1 Drawing Figure

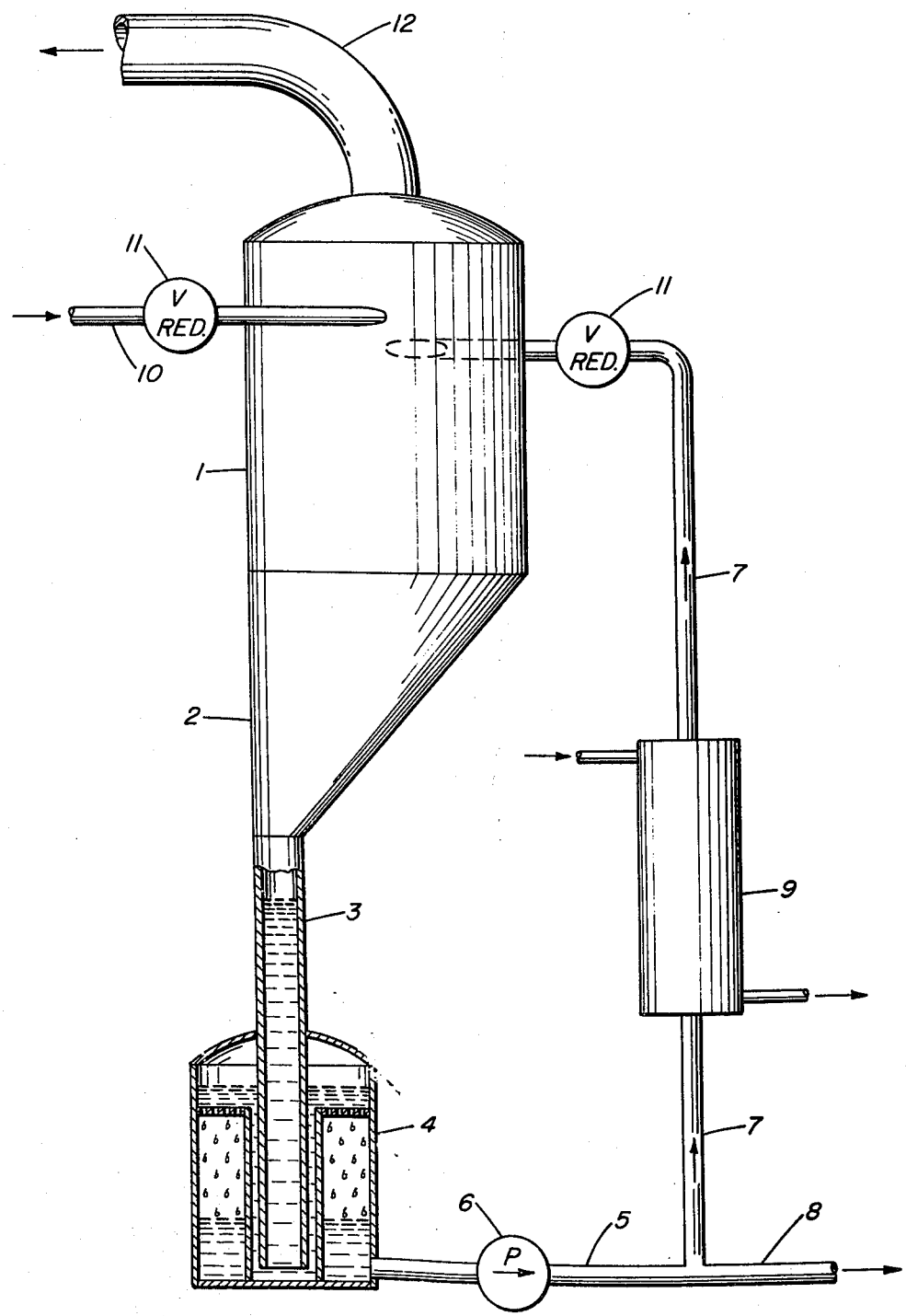

CONCENTRATING ACRYLAMIDE SOLUTIONS

The invention relates to concentrating aqueous solutions of acrylamide monomer. To carry out a process to produce acrylamide by catalytic hydration of acrylonitrile using any of several heterogeneous solid catalysts, it is preferred to contact the solid catalysts with a homogeneous, water-rich, acrylonitrile aqueous feed solution. The solubility of acrylonitrile in a water-rich aqueous solution is limited to about 6 to 8 percent acrylonitrile. Even using a saturated solution, the aqueous acrylonitrile feed will be quite low in acrylonitrile concentration. Presence of acrylamide in the hydration feed solution will increase the solubility of acrylonitrile, but the same presence of acrylamide in the hydration reaction mixture tends to inhibit the catalytic hydration reaction. By addition of acrylonitrile reactant to the reaction solution in stages as the solution moves through the reactor, the concentration of acrylamide in the product solution can be increased to some extent. This can be done by inserting acrylonitrile at points along the stream as the reactants proceed through a single catalyst bed, or by use of staged reactors with addition of reactant between stages. A practical upper limit is reached at about 15-25 percent acrylamide by weight, beyond which the yield from the catalytic hydration reaction becomes uneconomically too low.

An object of the invention is to provide a practical process for concentrating aqueous acrylamide solution from about 10-25 percent by weight acrylamide up to about 30-50 percent by weight acrylamide, by rapid evaporation of water from the solution.

Concentration of such solutions by rapid evaporation at first seemed impractical because the very conditions that are needed for rapid evaporation are the conditions which would cause undesired polymerization of the acrylamide in more concentrated monomer solutions. Soluble polymer as well as insoluble polymers would be produced during evaporation. Inhibitors added in the solution to stop the polymerization would be either removed during evaporation or would be difficult to remove after the evaporation, or would be found not completely effective. Oxygen dissolved even in very small amounts in the aqueous solution is known to be an effective polymerization inhibitor, but it is removed by the boiling required for rapid evaporation of the solution. Cupferron in the solution is an effective polymerization inhibitor but is difficult to remove from the concentrated product solution.

An object of the invention is to provide a rapid evaporation process for concentrating aqueous acrylamide solutions with minimum resulting polymerization of acrylamide monomer in the solution during the concentrating process.

According to the invention, aqueous acrylamide liquid solution is concentrated by vacuum flash evaporation under conditions controlled to inhibit the polymerization of acrylamide in the solution. Such control of conditions includes constantly washing the inner walls of the evaporation chamber with liquid acrylamide solution during evaporation, construction of the vessels with smooth walls and with no dead space for liquid accumulation. Furthermore, concentrated liquid residue is not permitted to accumulate in the evaporator vessel; it is immediately removed and restored to atmospheric pressure and, as quickly as practicable, it is saturated with oxygen at atmospheric pressure to restore the polymerization inhibiting effect of absorbed oxygen in the solution. Part of the aerated concentrated solution is recirculated constantly to the evaporator and heat is added by means of this recirculation stream as needed to provide heat of vaporization for the desired evaporation rate.

It is preferable to conduct the evaporation under reduced pressure to obtain flash evaporation; also, the reduced pressure enables rapid evaporation at a reduced boiling temperature which is less conducive to polymerization. To obtain flash vaporization, the liquid feed solutions are heated at atmospheric pressure to a selected temperature which is below the atmospheric boiling point of the solution, but which is above the boiling point of the liquid at the selected reduced pressure inside the evaporator. On entry of the heated solution to the evaporation chamber, the most volatile components of the solution are flash vaporized by heat energy that is released as the liquid temperature falls to the lower boiling point of the liquid at the reduced pressure inside the chamber. The thermodynamics governing flash evaporation are well known and need not be reviewed here. Vacuum flash evaporation is particularly useful for the present process because its use will minimize the necessary residence time of acrylamide in the evaporator and thereby minimize the time available for polymerization to occur in the deaerated liquid concentrate before the restoration of oxygen inhibitor.

A particularly troublesome problem in concentrating aqueous acrylamide solutions by rapid evaporation is the spontaneous formation of solid insoluble polymer in the solution after the oxygen inhibitor has been removed by boiling. Insoluble polyacrylamide appears in the liquid solution as tiny solid particles which grow rapidly. The physical appearance of this insoluble polymer has led to it being called "popcorn." Such unwanted spontaneous polymerization wastefully consumes part of the monomer product; the solid particulate polymer collects in valves and pumps and on the walls of lines and vessels. The polymer particles will initiate further polymerization unless such polymerization is quickly inhibited. Inside the flash evaporation vessel, popcorn will tend to form and gather on those wall surfaces which are not constantly washed with the solution. Accordingly there is provided, inside the evaporation vessel, means for constantly washing the exposed inner walls of the vessel with liquid aqueous acrylamide solution. The fresh feed and recycle feed streams are fed tangentially into the vessel along the inner cylindrical walls with sufficient force to direct the feed liquid circumferentially around the inner walls of the vessel and the liquid naturally flows downward along the vessel walls to the liquid level. This is one suitable means for providing constant washing of the walls below the feed liquid entry level. Even above the feed liquid entry level in the evaporation vessel, popcorn sometimes tends to develop on the vessel walls during evaporation, probably due to entrainment of acrylamide solution by the rising vapors. To counteract this, even those surfaces in the evaporation chamber above the main feed entry level, are constantly washed with small amounts of acrylamide solution to prevent accumulation of deaerated acrylamide solution. To avoid popcorn formation in any accumulated liquid concentrate at the bottom of the vessel, the liquid outlet from the evaporation chamber is designed to provide straight-through, smooth, constant removal of the residue liquid to atmospheric pressure. To bring the liquid exit pressure up to atmospheric pressure, we prefer to employ instead of a pump which might have dead space for popcorn accumulation, a vertical tubular barometric arm in which the liquid can stand as a hydraulic column to force liquid from the bottom of the barometric arm into the atmosphere. Immediately on exit to atmospheric pressure, the liquid concentrate from the evaporator is aerated to restore oxygen inhibitor in the solution. So long as absorbed oxygen is present in the aqueous acrylamide solutions, the formation of polymers is effectively inhibited. Likewise the aerator is designed so that aeration by gas-liquid contact is obtained before passing the concentrate liquid through any valves, pumps or other apparatus that may have stagnant regions which would be conducive to popcorn formation. Once the oxygen saturation has been restored, the tendency to polymerization in the solution is largely reduced so more conventional equipment can be used.

Vapors taken from the flash evaporation chamber consist mostly of water with lesser amounts of other volatile components such as residual acrylonitrile which may be present in the solution being condensed; the oxygen which is removed from solution by boiling is also carried in the vapor stream. The vapor stream is removed directly to a chilled condenser in which the water and other condensible components are liquefied. Non-condensible gas such as oxygen is exhausted from the condenser through the same vacuum pump means which maintains reduced pressure in the flash evaporation vessel. Condensed liquids taken from the vapor stream are preferably returned to the reactor feed stream; particularly this is preferred in cases where the condensate contains residual acrylonitrile.

Several evaporators of the kind described may be operated in series with liquid concentrate from the first evaporator constituting a fresh feed stream for the second evaporator. Such series operation of several evaporators is expecially preferred in instances where it is desired to remove acrylonitrile to very low concentration in the concentrate product.

The heater for the recirculation stream raises the stream temperature from existing temperature, which is usually slighly below the boiling point in the evaporator, to a temperature higher than such boiling point inside the evaporation vessel. The inlet temperature of the recirculation stream is selected at a value to provide the heat of vaporization desired in a single pass. Heat added to the recirculation stream will in most cases be the principal means for carrying heat of vaporization into the vessel. Another source for part of such heat of vaporization may be in the fresh feed stream, which preferably will also be heated to temperature higher than the boiling point inside the evaporator. In the evaporation vessel the fresh and recirculated liquids are quickly mixed so it is largely immaterial which stream is used to carry heat into the vessel.

The process of the invention can be adapted to considerable extent by variation of operating conditions to fit certain requirements, for example to accommodate a given fresh feed temperature and feed concentration and to produce the desired concentration of acrylamide product solution with very low acrylonitrile residue. Similarly the process is adaptable by variation of conditions to accommodate evaporator design. By the same token equipment may be especially designed for operation of the process at selected operating pressures, temperatures, concentrations, etc., as needed for optimum operation with given feed and product specifications.

A preferred apparatus for carrying out the process of the invention is illustrated diagrammatically in the drawings:

The drawing is a diagrammatic drawing showing the relation of the several apparatus components used for carrying out a preferred embodiment of the invention.

Referring now to the FIGURE, reference numeral 1 indicates a vacuum flash evaporation vessel having a cylindrical upper portion and a conical lower portion 2 with gradually reducing diameter toward the lower end which opens to a barometric arm 3 for liquid exit from the vessel. At the lower end of the barometric arm is an aerator 4 in which liquid removed from the evaporator through the barometric arm is contacted with oxygen or air for restoration of absorbed oxygen in the liquid. Aerator exit line 5 carries the aerated liquid, by means of a pump 6 to the liquid recycle line 7 and the liquid product line 8. A heater 9 is provided in the recycle line for adding heat to the recycle liquid stream.

Feed streams to the evaporator enter from a fresh feed line 10 and the recycle feed line 7 through tangential feed ports in the vessel wall. Each feed line is equipped with a pressure reducing valve 11. Overhead vapor line 12 transmits vapors from the evaporator 1 to condensers and vacuum pumps which are conventional equipment and are not shown in the drawings.

A product stream taken from the catalytic nitrile hydration process is directed into the vacuum flash evaporation chamber 1 by the fresh feed liquid line 10. Flow of the fresh feed to the evaporator 1 is regulated by a pressure reduction valve 11 on the fresh feed line. Inside the cylindrical upper portion of the evaporator chamber the fresh feed flows horizontally around the inner cylindrical walls near the upper end of the vessel while falling downward along the evaporator walls toward the bottom of the vessel. This flow along the walls provides maximum surface exposure of the liquid in the vessel and is conducive to rapid evaporation at the reduced pressure. Furthermore it provides constant washing of the walls with the solution. It is preferable for the fresh feed liquid to enter at temperature above the boiling point at the selected reduced pressure, so that evaporation by boiling will begin immediately upon entry. In cases where the fresh feed enters at temperatures below such boiling point, the heat needed for flash evaporation in the vessel will have to be added by means of the recycle feed stream. In most cases a single pass of the fresh feed alone through the evaporation would not remove the desired proportion of water and in such cases a recycle feed stream is provided.

Vapors produced in the vessel by the flash evaporation are constantly removed overhead through a vapor conduit 12 at the top of the vessel. The vapors are conducted into a brine-chlled condenser in which condensible components of the vapor stream, e.g., water and acrylonitrile are condensed to liquid state as vacuum pumps constantly withdraw and exhaust non-condensible gases (e.g., air) from the condenser. Thus, the selected reduced pressure in the evaporator is maintained by the condenser and vacuum pump system. Condensed liquid may be returned to the hydration reaction if there is acrylonitrile in the condensate.

The liquid residue in the vessel is removed constantly from the bottom of the evaporator without being allowed to accumulate there. Preferably the liquid falls directly along the walls to the bottom outlet which opens directly into a barometric arm which is a vertical tube of height sufficient to maintain a hydraulic column that will force liquid from the bottom of the barometric arm into the atmosphere. Alternatively a pressure pump could be used to draw liquid from the bottom vessel outlet to atmospheric pressure. The barometric arm at its lower end is immersed in a small well of the residue liquid which serves as a seal and from which the liquid constantly overflows onto a perforated horizontal distribution plate. Liquid flowing across the plate falls through perforations into an air space in which fresh air is maintained by suitable circulation means. On the plate and in the air space the air-liquid contact restores oxygen to saturation by absorption into the liquid evaporation residue solution. After such resaturation with oxygen the liquid accumulates in a liquid storage space below the air space whence it is removed to storage and used in part for reflux to the condenser or as the fresh feed to a second flash evaporator of the same construction.

As mentioned above, it is preferred to heat and recycle part of the liquid residue to the flash evaporator. When operating continuously, the reflux stream will have the same composition as the residue removed from the vessel and the purpose for reflux is to carry heat of vaporization into the vessel. A second purpose for reflux is to provide liquid to wash the vessel walls. Still another purpose is to carry oxygen into the evaporator. The reflux volume and temperature are adjusted to provide the extra heat calculated to vaporize an amount of water in the evaporator equal to that which must be removed to reduce the fresh feed stream to the selected outlet liquid concentration. Part of such heat may be carried in the fresh feed stream and the remainder is supplied by the reflux stream. The reflux stream is heated at atmospheric pressure by any suitable means as by a heat exchanger, for example a steam tube heater, and the heated liquid proceeds through a pressure reduction valve and into the evaporator through a tangential port which directs the feed stream horizontally around the cylindrical inner walls of the evaporator. The liquid falls along the inner walls to the bottom of the vessel whence it is removed as described before. It is preferred to have the fresh feed and recycle feed streams enter the vessel at tangential ports on opposite sides of the vessel to provide more complete coverage of the vessel walls with the feed liquids.

In one embodiment not shown in the drawing, nozzles may be positioned inside the evaporation chamber to constantly spray the inner surfaces of the vessel above the feed entry level with liquid solution to provide constant washing of those surfaces to avoid accumulation of entrained solution droplets on the walls. For the solution that is to be sprayed, we prefer to use aerated but unheated residue liquid which may be taken from the aerated product line, for example. In instances where acrylamide is entrained into the vapor line, sprays may be positioned to constantly spray the walls of the vapor line, using aerated but unheated product solution if the wash drains into the evaporator or using cold water when the wash drains into the condenser. Similarly, sprays may be positioned where needed in the vessel to wash any other inner surface area that is not constantly washed by the feed streams.

Following is a specific example of a process embodying the invention. Apparatus used corresponds with that shown in the drawings and described herein.

EXAMPLE 1

Using apparatus of the kind described above a fresh feed stream is fed into the evaporator at a steady rate of about 8,771 pounds per hour. This stream is about 15 percent by weight acrylamide in aqueous solution with about 3.7 percent by weight acrylonitrile. Temperatures of the feed solution prior to entry is about 80°C. A total of about 625,000 pounds per hour of aerated liquid concentrate is recycled to the reactor from the product solution stream which is about 25 percent by weight acrylamide aqueous solution with 0.7 percent acrylonitrile. Of the total recycle feed about 425,000 pound per hour is heated to 55°C. and fed to the vessel through the tangential entry port. The remaining 200,000 pounds per hour is not heated and is sprayed onto the inner walls of the vessel by sprays positioned to wet those portions of evaporator wall above the tangential ports. The vapor removed overhead consists of about 337.3 pounds per hour acrylonitrile, about 3,658 pounds per hour water and about 42 pounds per hour non-condensible gas, mostly air. Pressure in the evaporator is held by vacuum pumps at about 70 mm Hg at which the boiling point of the liquid in the evaporator is about 50°C. The foregoing quantities were actual measured values and reflect the apparent errors in actual measurements.

A second stage evaporator is operated in series with the one described above, of the same construction, using the aerated product stream from the first evaporator as fresh feed to the second.

In the second evaporator, 5,287 pounds per hour of 25 percent by weight acrylamide aqueous solution with less than 1 pound per hour acrylonitrile residue is the fresh feed stream which enters the second evaporator at about 50°C. The gross quantities recycled from the product stream and the recycle temperature and the operating pressure and boiling point in the evaporator are the same as in the first reactor described above. The aerated product stream is about 50 weight percent acrylamide aqueous solution with no more than trace amounts of acrylonitrile. The overhead stream contains less than 1 pound per hour acrylonitrile, about 3,154 pounds per hour water and about 42 pounds per hour non-condensibles, mostly air.

In each of the first stage and the second stage evaporators, the inside walls of the vapor conduit are sprayed with about 500 pounds per hour water taken from the condensate collector to keep the vapor conduit walls clear of any acrylamide which might be entrained in the vapor stream. By the described two-stage process, approximately 8,771 pounds per hour of 15 percent acrylamide aqueous solution with about 3.7 percent acrylonitrile is concentrated to about 2,632 pounds per hour of 50 percent acrylamide aqueous solution with practically no acrylonitrile. The product and apparatus is essentially free of solid acrylamide and when any soluble polymer is formed in the product, it is acceptably below the maximum concentration for ordinary product specifications.

The specific values for the several parameters in the foregoing example can be varied within the scope of the invention. The reduced pressure in the chamber for flash evaporation can be varied within a range from about 60 mm Hg to about 450 mm Hg to obtain a desired boiling point in the range from about 45°C. to about 95°C. The product and recycle stream after aeration and before heating will usually be at a temperature just below the selected boiling point inside the evaporator. The recycle temperatue obtained by heating the recycle stream is selected by design to carry enough heat into the vessel to evaporate the selected amount of water to be removed in a single pass. The temperature of the heated recycle stream may be in the range from about 3° to about 20° above the selected boiling point in the evaporator. Excessive heating would cause violent vaporization with consequent excessive entrainment and other difficulties. Insufficient heating would require excessive recycling. The rate of addition of fresh feed must be synchronized with the recycle rate and the recycle entry temperature, or, more specifically, with the vaporization rate, to provide addition of water in the fresh feed stream at a rate approximately equal to the rate of removal of water by vaporization. This balance maintains the product stream at the desired concentration. The entry temperature of the fresh feed stream is not especially important but it should preferably be constant and preferably near the selected boiling point at reduced pressure inside the vessel. The addition of oxygen, as the residue is taken from the vessel, can be by any suitable means in addition to that exemplified, as by injecting air or oxygen directly into the stream as it reaches atmospheric pressure.

I claim:

1. A process of concentrating aqueous acrylamide solution by flash evaporation of water therefrom while inhibiting polymerization of acrylamide, comprising the steps of
    a. flash-evaporating water from aqueous acrylamide feed solution having more than 50 percent by weight water in the total feed, by constantly introducing said feed solution into an evaporation chamber in which pressure has been reduced to a selected pressure in the range from about 60 to about 450 mm Hg and with at least a portion of said feed entering said chamber at temperature higher than the boiling point of said feed at the defined reduced pressure in said chamber, and
    b. constantly removing from said chamber to atmospheric pressure the liquid residue from said flash-evaporation at a rate sufficient to avoid accumulation of acrylamide solution in said chamber, and
    c. during said flash-evaporation in said chamber constantly washing the surfaces that contact acrylamide in said evaporation chamber, and
    d. as soon as said liquid residue from evaporation is removed to atmospheric pressure, restoring absorbed oxygen to saturation in said residue and,
    e. recycling part of said residue with oxygen restored to saturation therein to said evaporation chamber with the temperature of said recycled liquid below its atmospheric boiling point but above the existing boiling point of said liquid inside said chamber at the reduced pressure therein.

2. A process defined by claim 1 wherein the selected pressure in said evaporation chamber is about 70 mm Hg.

3. A process defined by claim 1 wherein liquid residue is removed from the bottom of the evaporation chamber to atmospheric pressure by means of a vertical barometric arm.

4. A process defined by claim 1 wherein liquid residue is aerated at atmospheric pressure by direct gas liquid contact of said residual liquid with air and thereby restoring oxygen to saturation in said solution.

* * * * *